(12) United States Patent
Onodera et al.

(10) Patent No.: US 9,080,489 B2
(45) Date of Patent: Jul. 14, 2015

(54) SELECTIVE CATALYTIC REDUCTION SYSTEM

(75) Inventors: Takao Onodera, Fujisawa (JP); Shinji Hara, Fujisawa (JP); Tomoyuki Kamijyou, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 446 days.

(21) Appl. No.: 13/699,491

(22) PCT Filed: May 16, 2011

(86) PCT No.: PCT/JP2011/061217
§ 371 (c)(1),
(2), (4) Date: Nov. 21, 2012

(87) PCT Pub. No.: WO2011/148814
PCT Pub. Date: Dec. 1, 2011

(65) Prior Publication Data
US 2013/0064718 A1   Mar. 14, 2013

(30) Foreign Application Priority Data

May 25, 2010  (JP) .................................. 2010-119719

(51) Int. Cl.
| | |
|---|---|
| *F01N 3/10* | (2006.01) |
| *G05D 7/00* | (2006.01) |
| *B01D 53/94* | (2006.01) |
| *F01N 3/20* | (2006.01) |
| *F01N 9/00* | (2006.01) |
| *F02D 41/14* | (2006.01) |

(52) U.S. Cl.
CPC ............... *F01N 3/2066* (2013.01); *F01N 9/00* (2013.01); *F02D 41/145* (2013.01); *F02D 41/146* (2013.01); *F02D 41/1463* (2013.01); *F02D 41/1465* (2013.01); *F01N 2560/026* (2013.01); *F01N 2610/02* (2013.01); *Y02T 10/24* (2013.01); *Y02T 10/47* (2013.01)

(58) Field of Classification Search
None
See application file for complete search history.

(56) References Cited

U.S. PATENT DOCUMENTS

| | | | |
|---|---|---|---|
| 6,699,383 | B2 | 3/2004 | Lemire et al. |
| 2008/0237064 | A1 | 10/2008 | Nakasone et al. |
| 2009/0223820 | A1 | 9/2009 | Ishiguro et al. |
| 2010/0024393 | A1* | 2/2010 | Chi et al. .................. 60/276 |

FOREIGN PATENT DOCUMENTS

| | | |
|---|---|---|
| JP | 2000-303826 | 10/2000 |
| JP | 2003-515166 | 4/2003 |

(Continued)

OTHER PUBLICATIONS

Patent Abstracts of Japan, Publication No. 2000-303826, Published Oct. 31, 2000.

(Continued)

*Primary Examiner* — Walter D Griffin
*Assistant Examiner* — Jelitza Perez
(74) *Attorney, Agent, or Firm* — Staas & Halsey LLP

(57) ABSTRACT

A Selective Catalytic Reduction ("SCR") system that can detect a $NO_x$ concentration accurately irrespective of an operation state of an engine is provided. The SCR system including: an SCR device; a dosing valve; a $NO_x$ sensor; and an urea solution injection control unit.

2 Claims, 3 Drawing Sheets

(56) References Cited

FOREIGN PATENT DOCUMENTS

JP 2009-210450 9/2009
WO WO 2007/119311 10/2007

OTHER PUBLICATIONS

Patent Abstracts of Japan, Publication No. 2009-210450, Published Sep. 17, 2009.

International Search Report of PCT/JP2011/061217 mailed Jun. 7, 2011.

Written Opinion of the International Searching Authority mailed Jun. 7, 2011 in corresponding International Application No. PCT/JP2011/061217.

* cited by examiner

SELECTIVE CATALYTIC REDUCTION SYSTEM

CROSS-REFERENCE TO RELATED APPLICATIONS

This application claims the foreign priority benefit of Japanese Application No. 2010-119719 filed May 25, 2010, the contents of which are incorporated herein by reference, which serves as priority for PCT Application No. JP2011/061217 filed May 16, 2011.

TECHNICAL FIELD

The present invention relates to an SCR system that reduces $NO_x$ in an exhaust gas from an engine using urea solution, and specifically relates to an SCR system that can detect a $NO_x$ concentration accurately irrespective of an operation state of an engine.

BACKGROUND ART

As an exhaust gas purification system for purifying $NO_x$ in an exhaust gas from a diesel engine, an SCR system using an SCR (selective catalytic reduction) device has been developed.

The SCR system supplies urea solution to an exhaust gas upstream of the SCR device to generate ammonia using heat of the exhaust gas, and using the ammonia, reduces $NO_x$ on an SCR catalyst to purify $NO_x$ (see, for example, patent literature 1).

In an SCR system, injection of urea solution is controlled according to the $NO_x$ concentration in an exhaust gas. For the control, a $NO_x$ sensor is provided in an exhaust pipe.

In the $NO_x$ sensor, after removal of $O_2$ in an exhaust gas, $NO_x$ in the exhaust gas from which $O_2$ has been removed is decomposed into $N_2$ and $O_2$, and an $O_2$ concentration in the exhaust gas in which $NO_x$ has been decomposed into $N_2$ and $O_2$ is detected, whereby a $NO_x$ concentration is detected.

CITATION LIST

Patent Literature

Patent Literature 1: Japanese Patent Laid-Open No. 2000-303826

SUMMARY OF INVENTION

Technical Problem

A characteristic of a $NO_x$ sensor is that a detected $NO_x$ concentration value varies according to pressure. In general, a $NO_x$ sensor is designed to detect a $NO_x$ concentration at an barometric pressure (1 atm), and thus, measurement of a $NO_x$ concentration under a pressure greatly different from the barometric pressure results in occurrence of the problem that an error in detected $NO_x$ concentration value becomes large (as the pressure is higher, the detected $NO_x$ concentration value is also higher).

A $NO_x$ sensor used in an SCR system is provided in an exhaust pipe for an engine; however, a pressure in the exhaust pipe for the engine, that is, a pressure of an exhaust gas largely varies depending on the operation state of the engine, causing the problem that a $NO_x$ concentration cannot be detected accurately by the $NO_x$ sensor.

A $NO_x$ concentration detected by a $NO_x$ sensor is used for urea solution injection quantity control and/or OBD (on-board diagnostics). Therefore, if $NO_x$ concentration detection cannot be performed accurately, a urea solution injection quantity is not normally controlled, causing the problem that an excessive quantity of urea solution is injected, or conversely, the urea solution injection quantity is lowered, resulting in a decrease in $NO_x$ purification efficiency. Furthermore, a problem also arises in that an on-board diagnosis cannot normally be made.

Therefore, an object of the present invention is to solve the above problem and provide an SCR system that can detect a $NO_x$ concentration accurately irrespective of an operation state of an engine.

Solution to Problem

The present invention has been made in order to achieve the above object, and provides an SCR system including: an SCR (selective catalytic reduction) device provided in an exhaust pipe for an engine; a dosing valve that injects urea solution on an upstream side of the SCR device; a $NO_x$ sensor provided in the exhaust pipe; and a urea solution injection control unit that controls a urea solution injection quantity according to a $NO_x$ concentration value detected by the $NO_x$ sensor, wherein the SCR system includes: a pressure estimation unit that estimates a $NO_x$ sensor pressure that is a pressure inside the exhaust pipe at a position where the $NO_x$ sensor is provided; and a $NO_x$ concentration detection value correction unit that corrects the $NO_x$ concentration value detected by the $NO_x$ sensor, according to the $NO_x$ sensor pressure estimated by the pressure estimation unit.

It is possible that: the $NO_x$ sensor is provided on the upstream side of the SCR device; and the pressure estimation unit includes an exhaust gas flow estimation unit that estimates an exhaust gas flow by summing an intake air flow of the engine and a fuel flow calculated from an engine rotation speed and a fuel injection quantity, an exhaust gas specific volume estimation unit that estimates an exhaust gas specific volume, based on an SCR entrance temperature that is an exhaust gas temperature at an entrance of the SCR device, and an barometric pressure, an SCR differential pressure estimation unit that estimates a differential pressure between a pressure at the entrance of the SCR device and the barometric pressure, based on the exhaust gas flow estimated by the exhaust gas flow estimation unit, the exhaust gas specific volume estimated by the exhaust gas specific volume estimation unit, and the SCR entrance temperature, and a $NO_x$ sensor pressure estimation unit that estimates a $NO_x$ sensor pressure by adding the barometric pressure to the differential pressure estimated by the SCR differential pressure estimation unit.

Advantageous Effects of Invention

The present invention enables provision of an SCR system that can detect a $NO_x$ concentration accurately irrespective of an operation state of an engine.

DESCRIPTION OF EMBODIMENT

A preferred embodiment of the present invention will be described below with reference to the drawings.

First, an SCR system to be installed in a vehicle will be described.

Figure 1A:
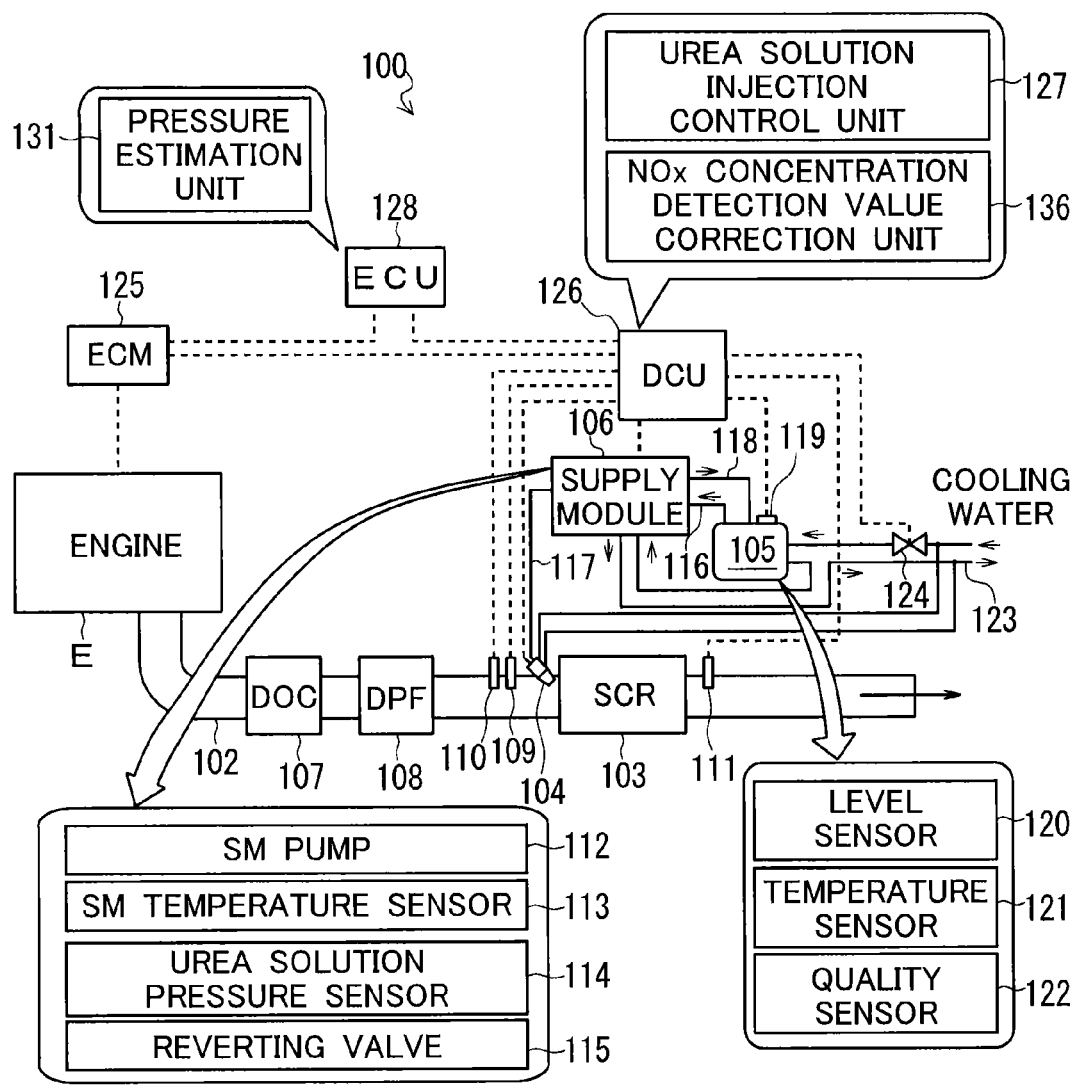
FIGS. 1(a) and 1(b) are diagrams each illustrating a schematic configuration of an SCR system according to an embodiment of the present invention.
Figure 1B:
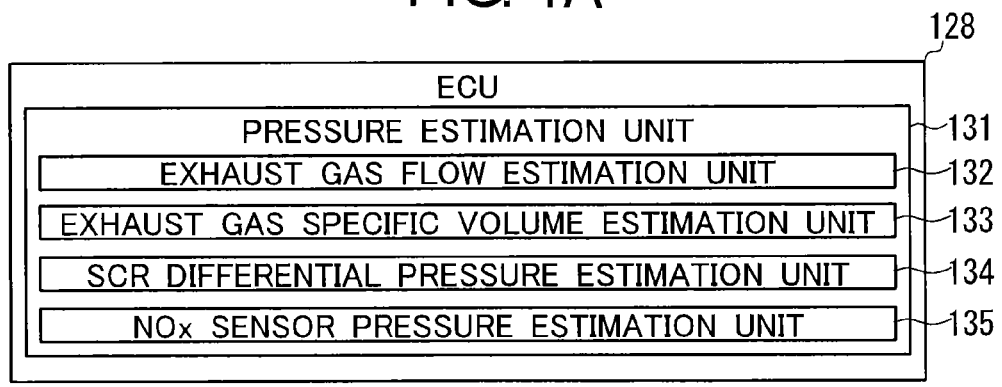

As illustrated in FIG. 1(a), an SCR system 100 mainly includes: an SCR device 103 provided in an exhaust pipe 102 for an engine E; a dosing valve (urea injection device or dosing module) 104 that injects urea solution on the upstream side of the SCR device 103 (upstream side of an exhaust gas); a urea tank 105 that stores urea solution; a supply module 106 that supplies urea solution stored in the urea tank 105 to the dosing valve 104 and a DCU (dosing control unit) 126 that controls, e.g., the dosing valve 104 and the supply module 106.

In the exhaust pipe 102 for the engine E, a DOC (diesel oxidation catalyst) 107, a DPF (diesel particulate filter) 108 and the SCR device 103 are sequentially disposed from the upstream side to the downstream side of an exhaust gas. The DOC 107 is provided to oxidize $NO_x$ in an exhaust gas emitted from the engine E to $NO_2$ to control a ratio between $NO_x$ and $NO_2$ in the exhaust gas for enhancement in denitration efficiency of the SCR device 103. Also, the DPF 108 is provided to collect PM (particulate matter) in the exhaust gas.

In the exhaust pipe 102 on the upstream side of the SCR device 103, the dosing valve 104 is provided. The dosing valve 104 has a structure in which a cylinder filled with high-pressure urea solution is provided with an injection orifice and a valving element occluding the injection orifice is attached to a plunger, and upon energization of a coil to pull up the plunger, the valving element is moved away from the injection orifice, whereby urea solution is injected. Upon the energization of the coil being stopped, the plunger is pulled down by means of an internal spring force so that the valving element occludes the injection orifice, whereby the injection of urea solution is stopped.

In the exhaust pipe 102 on the upstream side of the dosing valve 104, an exhaust temperature sensor 109 that measures a temperature of an exhaust gas at an entrance of the SCR device 103 (SCR entrance temperature) is provided. Also, on the upstream side of the SCR device 103 (here, the upstream side of the exhaust temperature sensor 109), an upstream-side $NO_x$ sensor 110 that detects a $NO_x$ concentration on the upstream side of the SCR device 103 is provided, and on the downstream side of the SCR device 103, a downstream-side $NO_x$ sensor 111 that detects a $NO_x$ concentration on the downstream side of the SCR device 103 is provided.

The supply module 106 includes: an SM pump 112 that pressure-feeds urea solution; an SM temperature sensor 113 that measures a temperature of the supply module 106 (temperature of urea solution flowing in the supply module 106); a urea solution pressure sensor 114 that measures a pressure of the urea solution in the supply module 106 (pressure on the discharge side of the SM pump 112); and a reverting valve 115 that switches between supply of urea solution from the urea tank 105 to the dosing valve 104 and return of urea solution in the dosing valve 104 to the urea tank 105 by switching between flow passages of urea solution. Here, arrangement is made so that when the reverting valve 115 is off, the urea solution from the urea tank 105 is supplied to the dosing valve 104 and when the reverting valve 115 is on, the urea solution in the dosing valve 104 is returned to the urea tank 105.

When switching of the reverting valve 115 is made so that urea solution is supplied to the dosing valve 104, the supply module 106 sucks up urea solution in the urea tank 105 through a liquid feed line 116 via the SM pump 112 and supplied to the dosing valve 104 through a pressure-feed line 117 and extra urea solution is returned to the urea tank 105 through a collection line 118.

In the urea tank 105, an SCR sensor 119 is provided. The SCR sensor 119 includes: a level sensor 120 that measures a liquid level of urea solution in the urea tank 105; a temperature sensor 121 that measures a temperature of the urea solution in the urea tank 105; and a quality sensor 122 that measures a quality of the urea solution in the urea tank 105. The quality sensor 122 is configured to detect a concentration of urea solution and/or whether a heterogeneous mixture is mixed in the urea solution, based on, for example, an ultrasound propagation speed and/or electrical conductivity to detect a quality of the urea solution in the urea tank 105.

A cooling line 123 that circulates cooling water for cooling the engine E is connected to the urea tank 105 and the supply module 106. The cooling line 123 runs through the inside of the urea tank 105 for heat exchange between cooling water flowing in the cooling line 123 and urea solution in the urea tank 105. Likewise, the cooling line 123 runs through the inside of the supply module 106 for heat exchange between the cooling water flowing in the cooling line 123 and urea solution in the supply module 106.

In the cooling line 123, a tank heater valve (coolant valve) 124 that provides a switch for whether or not cooling water is supplied to the urea tank 105 and the supply module 106 is provided. Although the cooling line 123 is connected also to the dosing valve 104, arrangement is made so that cooling water is supplied to the dosing valve 104 irrespective of whether the tank heater valve 124 is opened or closed. The cooling line 123 is disposed along the liquid feed line 116, the pressure-feed line 117 and the collection line 118 through which urea solution passes, which is, however, not illustrated in FIG. 1(a) for simplification of the Figure.

Figure 2:
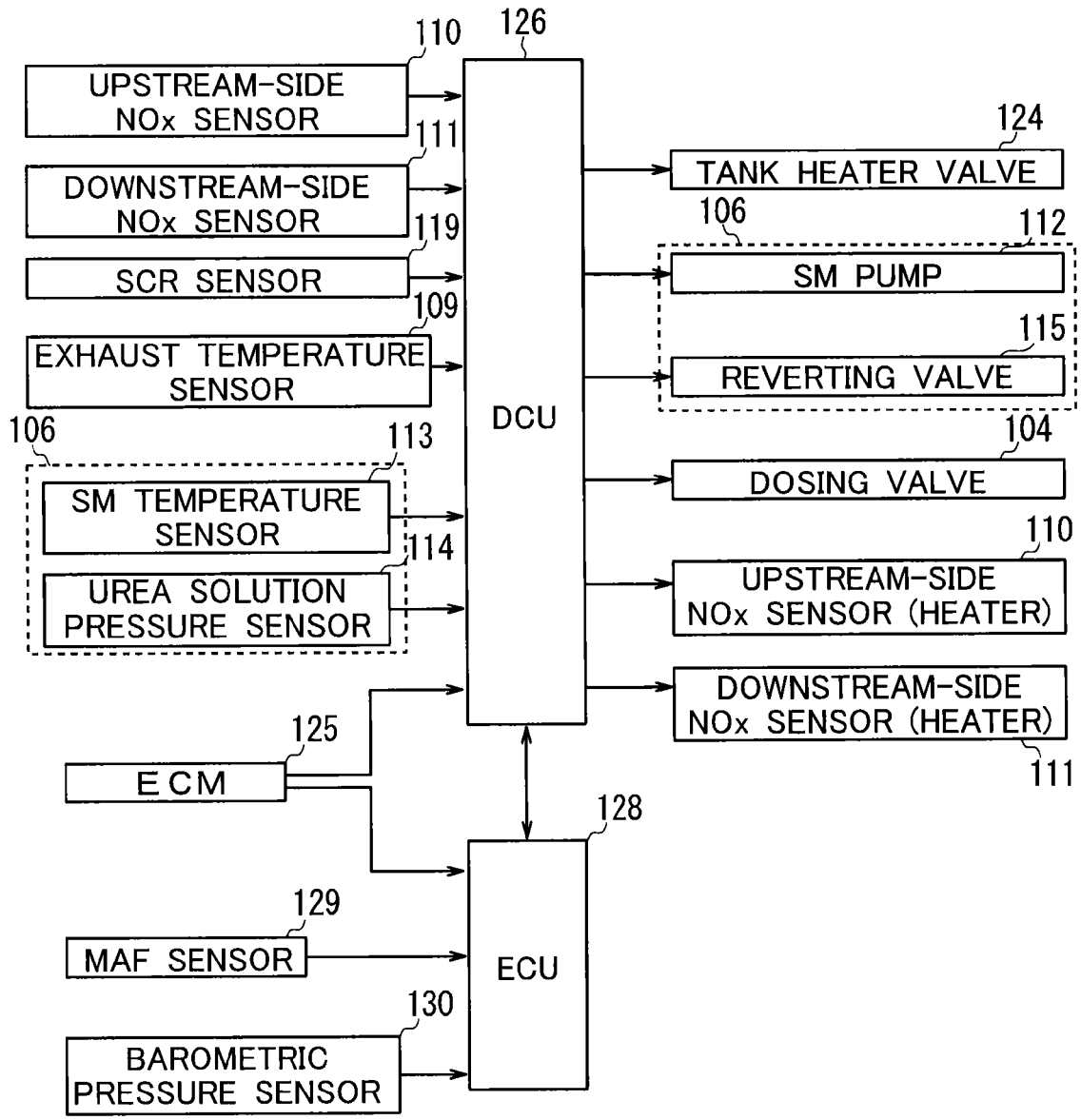
FIG. 2 is a diagram of an input/output configuration in the SCR system in FIG. 1.

FIG. 2 is a diagram of an input/output configuration of the DCU 126.

As illustrated in FIG. 2, input signal lines from the upstream-side $NO_x$ sensor 110, the downstream-side $NO_x$ sensor 111, the SCR sensor 119 (the level sensor 120, the temperature sensor 121 and the quality sensor 122), the exhaust temperature sensor 109, the SM temperature sensor 113 and the urea solution pressure sensor 114 in the supply module 106 and an ECM (engine control module) 125 that controls the engine E are connected to the DCU 126. From the ECM 125, signals for an external air temperature and engine parameters (e.g., engine rotation speed) are input.

Also, output signal lines to the tank heater valve 124, the SM pump 112 and the reverting valve 115 in the supply module 106, the dosing valve 104, a heater for the upstream-side $NO_x$ sensor 110 and a heater for the downstream-side $NO_x$ sensor 111 are connected to the DCU 126. Here, input/output of signals between the DCU 126 and the respective members may be made via the individual signal lines or a CAN (controller area network).

Also, an ECU (electronic control unit) 128 is connected to the DCU 126 via a transmission channel in the CAN. A signal of an SCR entrance temperature detected by the exhaust temperature sensor 109 is transmitted from the DCU 126 to the ECU 128. Also, a signal of a $NO_x$ sensor pressure, which will be described later, is transmitted from the ECU 128 to the DCU 126.

Furthermore, the ECM 125 is connected to the ECU 128 via the transmission channel in the CAN, and the ECU 128 receives signals of engine parameters (e.g., engine rotation speed and fuel injection quantity) from the ECM 125. Furthermore, input signal lines from an intake air flow sensor (MAF sensor) 129 provided in an intake pipe for the engine E and an barometric pressure sensor 130 are connected to the ECU 128.

A urea solution injection control unit 127 that controls a urea solution injection quantity according to a $NO_x$ concentration value detected by the upstream-side $NO_x$ sensor 110, is installed in the DCU 126. The urea solution injection control unit 127 is configured to estimate a quantity of $NO_x$ in an exhaust gas based on the signals for the engine parameters from the ECM 125 and a temperature of the exhaust gas from the exhaust temperature sensor 109 and determine a quantity of urea solution to be injected from the dosing valve 104 based on the estimated quantity of $NO_x$ in the exhaust gas, and furthermore, when the determined quantity of urea solution is injected via the dosing valve 104, control the dosing valve 104 based on a value detected by the upstream-side $NO_x$ sensor 110 to adjust the quantity of urea solution injected via the dosing valve 104.

The SCR system 100 according to the present embodiment includes a pressure estimation unit 131 that estimates a $NO_x$ sensor pressure that is a pressure inside the exhaust pipe 102 at a position where the upstream-side $NO_x$ sensor 110 is provided, and a $NO_x$ concentration detection value correction unit 136 that corrects a $NO_x$ concentration value detected by the upstream-side $NO_x$ sensor 110, according to the $NO_x$ sensor pressure estimated by the pressure estimation unit 131.

The pressure estimation unit 131 is installed in the ECU 128, and the $NO_x$ concentration detection value correction unit 136 is installed in the DCU 126. However, both of them may be installed in the DCU 126.

The pressure estimation unit 131 includes an exhaust gas flow estimation unit 132, an exhaust gas specific volume estimation unit 133, an SCR differential pressure estimation unit 134 and a $NO_x$ sensor pressure estimation unit 135.

The exhaust gas flow estimation unit 132 is configured to estimate an exhaust gas flow (exhaust gas mass flow) by summing an intake air flow (intake air mass flow) of the engine E and a fuel flow calculated from the engine rotation speed and the fuel injection quantity.

More specifically, the exhaust gas flow estimation unit 132 is configured to calculate an intake air flow of the engine E by averaging an intake air flow detected by the MAF sensor 129 for a predetermined period of time to calculate an average intake air mass flow and letting the calculated average intake air mass flow through a low-pass filter with a time constant set according to the engine rotation speed. Use of the low-pass filter enables suppression of rapid variation in value of the intake air flow of the engine E.

Also, the exhaust gas flow estimation unit 132 is configured to calculate a fuel flow by multiplying a fuel volume calculated by the engine rotation speed and the fuel injection quantity received from the ECM 125, by a fuel density. For the fuel injection quantity, a value obtained by summing a designated injection quantity, a post-injection quantity and an exhaust pipe injection quantity (only for a vehicle that performs exhaust pipe injection).

Furthermore, the exhaust gas flow estimation unit 132 is configured to suppress rapid variation in value of the exhaust gas flow by letting the exhaust gas flow calculated by summing the intake air flow and the fuel flow through the low-pass filter with a time constant set according to the engine rotation speed.

The exhaust gas specific volume estimation unit 133 is configured to estimate a specific volume of the exhaust gas based on the SCR entrance temperature received from the DCU 126 and an barometric pressure (external air pressure) received from the barometric pressure sensor 130. More specifically, the exhaust gas specific volume estimation unit 133 is configured to calculate a specific volume of the exhaust gas by multiplying the SCR entrance temperature by a gas constant of the exhaust gas set in advance for the respective vehicle (respective vehicle type and make) and dividing the obtained value by the barometric pressure.

The SCR differential pressure estimation unit 134 is configured to estimate a differential pressure between a pressure at the entrance of the SCR device 103 and the barometric pressure (external air pressure) (hereinafter simply referred to as SCR differential pressure) based on the exhaust gas flow estimated by the exhaust gas flow estimation unit 132, the specific volume of the exhaust gas estimated by the exhaust gas specific volume estimation unit 133, and the SCR entrance temperature received from the DCU 126. Here, the pressure at the entrance of the SCR device 103 is equal to the pressure inside the exhaust pipe 102 at the position where the upstream-side $NO_x$ sensor 110 is provided, that is, the $NO_x$ sensor pressure.

More specifically, the SCR differential pressure estimation unit 134 is configured to determine a value that is a base for the SCR differential pressure (hereinafter referred to as SCR base differential pressure) with reference to a base differential map (not illustrated) in terms of the exhaust gas flow and the specific volume of the exhaust gas. Here, the base differential map is a map set in advance for the respective vehicle (respective vehicle type and make), which is a map with a base differential pressure set for each respective exhaust gas flow and each respective specific volume of the exhaust gas.

Furthermore, the SCR differential pressure estimation unit 134 is configured to calculate a Reynolds number at the entrance of the SCR device 103 by calculating a viscosity coefficient of the exhaust gas at the entrance of the SCR device 103 from the SCR entrance temperature and multiplying the inverse of the obtained viscosity coefficient and the exhaust gas flow. Furthermore, the SCR differential pressure estimation unit 134 is configured to determine a flow coefficient of the exhaust gas at the entrance of the SCR device 103 with reference to a flow coefficient map (not illustrated) in terms of the calculated Reynolds number and the SCR entrance temperature. Here, the flow coefficient map is a map set in advance for the respective vehicle (respective vehicle type and make), which is a map with an exhaust gas flow coefficient (shape coefficient for a relationship between pressure loss and flow) set for each Reynolds number and each respective SCR entrance temperature.

The SCR differential pressure estimation unit 134 is configured to calculate an SCR differential pressure by multiplying the calculated base differential pressure and the flow coefficient.

The $NO_x$ sensor pressure estimation unit 135 is configured to estimate an pressure on the upstream side of the SCR device 103, that is, the $NO_x$ sensor pressure, which is a pressure inside the exhaust pipe 102 at the position where the upstream-side $NO_x$ sensor 110 is provided, by adding the barometric pressure (external air pressure) received from the barometric pressure sensor 130 to the SCR differential pressure estimated by the SCR differential pressure estimation unit 134. The $NO_x$ sensor pressure estimation unit 135 is configured to transmit a signal of the estimated $NO_x$ sensor pressure to the DCU 126.

The $NO_x$ concentration detection value correction unit 136 installed in the DCU 126 receives the signal of the $NO_x$ sensor pressure from the $NO_x$ sensor pressure estimation unit 135 and determines a correction coefficient with reference to a correction coefficient map in terms of the $NO_x$ sensor pressure. The correction coefficient map is a map set in advance for the respective vehicle type (respective vehicle type and make), which is a map with a correction coefficient set for each $NO_x$ sensor pressure. The correction coefficients are determined by conducting tests in advance.

The $NO_x$ concentration detection value correction unit 136 is configured to correct a $NO_x$ concentration value detected by the upstream-side $NO_x$ sensor 110 by multiplying the $NO_x$ concentration value by the obtained correction coefficient. The urea solution injection control unit 127 is configured to control the urea solution injection quantity using the corrected detected $NO_x$ concentration value.

As described above, the SCR system 100 according to the present embodiment includes the pressure estimation unit 131 that estimates a $NO_x$ sensor pressure that is a pressure inside the exhaust pipe 102 at the position where the upstream-side $NO_x$ sensor 110 is provided, and the $NO_x$ concentration detection value correction unit 136 that corrects a $NO_x$ concentration value detected by the upstream-side $NO_x$ sensor 110, according to the $NO_x$ sensor pressure estimated by the pressure estimation unit 131.

Figure 3:
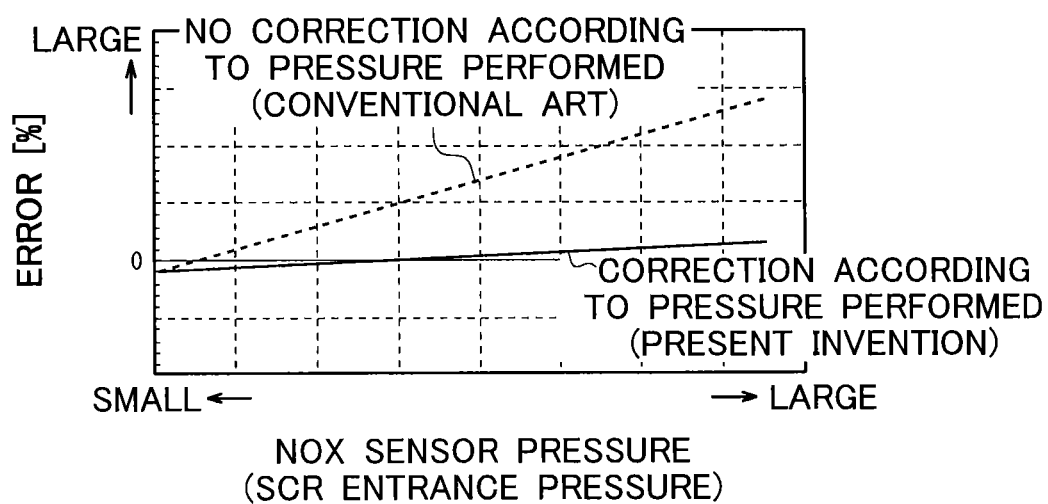
FIG. 3 is a graph indicating a relationship between $NO_x$ sensor pressure and error in $NO_x$ concentration value detected by a $NO_x$ sensor in the present invention.

As illustrated in FIG. 3, with a conventional SCR system (dashed line in the Figure), in which a detected $NO_x$ concentration value is not corrected according to a $NO_x$ sensor pressure, as the $NO_x$ sensor pressure increases, an error in $NO_x$ concentration value detected by the upstream-side $NO_x$ sensor 110 increases, and a $NO_x$ concentration cannot be detected accurately. Meanwhile, with the SCR system 100 according to the present invention (solid line in the Figure), a value detected by the upstream-side $NO_x$ sensor 110 is corrected according to an estimated $NO_x$ sensor pressure, and thus, even if the $NO_x$ sensor pressure is large, an error in $NO_x$ concentration value detected by the upstream-side $NO_x$ sensor 110 can be maintained to be small and $NO_x$ concentration can be detected accurately.

In other words, the SCR system 100 according to the present embodiment enables a $NO_x$ concentration to be detected accurately irrespective of $NO_x$ sensor pressure, that is, an operation state of the engine. Accordingly, the trouble that an urea solution injection quantity is not normally controlled, resulting in an excessive quantity of urea solution being injected or conversely, an urea solution injection quantity is lowered, resulting in a decrease in $NO_x$ purification efficiency can be solved. Also, the trouble that an OBD (on-board diagnosis) cannot normally be made can be solved.

The present invention is not limited to the above embodiment, and it should be understood that various alterations are possible without departing from the spirit of the present invention.

For example, although the above embodiment has been described in terms of a case where a $NO_x$ concentration value detected by the upstream-side $NO_x$ sensor 110 is corrected, the present invention is applicable also to the downstream-side $NO_x$ sensor 111. Where the present invention is applied to the downstream-side $NO_x$ sensor 111, since a $NO_x$ sensor pressure of the downstream-side $NO_x$ sensor 111 can be obtained by deducing a pressure loss occurring in the SCR device 103 from a $NO_x$ sensor pressure in the upstream-side $NO_x$ sensor 110, which has been described above, a $NO_x$ concentration value detected by the downstream-side $NO_x$ sensor 111 may be corrected according to the obtained $NO_x$ sensor pressure.

REFERENCE SIGNS LIST

100 SCR system
102 exhaust pipe
103 SCR device
104 dosing valve
105 urea tank
106 supply module
110 upstream-side $NO_x$ sensor ($NO_x$ sensor)
111 downstream-side $NO_x$ sensor
125 ECM
126 DCU
127 urea solution injection control unit
128 ECU
131 pressure estimation unit
132 exhaust gas flow estimation unit
133 exhaust gas specific volume estimation unit
134 SCR differential pressure estimation unit
135 $NO_x$ sensor pressure estimation unit
136 $NO_x$ concentration detection value correction unit
E engine

The invention claimed is:
1. An SCR system including:
an SCR (selective catalytic reduction) device provided in an exhaust pipe for an engine;
a dosing valve that injects urea solution on an upstream side of the SCR device;
a $NO_x$ sensor provided in the exhaust pipe; and
a urea solution injection control unit that controls a urea solution injection quantity according to a $NO_x$ concentration value detected by the $NO_x$ sensor,
wherein the SCR system comprises:
a pressure estimation unit that estimates a $NO_x$ sensor pressure that is a pressure inside the exhaust pipe at a position where the $NO_x$ sensor is provided; and
a $NO_x$ concentration detection value correction unit that corrects the $NO_x$ concentration value detected by the $NO_x$ sensor, according to the $NO_x$ sensor pressure estimated by the pressure estimation unit.
2. The SCR system according to claim 1,
wherein the $NO_x$ sensor is provided on the upstream side of the SCR device; and
wherein the pressure estimation unit includes an exhaust gas flow estimation unit that estimates an exhaust gas flow by summing an intake air flow of the engine and a fuel flow calculated from an engine rotation speed and a fuel injection quantity,
an exhaust gas specific volume estimation unit that estimates an exhaust gas specific volume, based on an SCR entrance temperature that is an exhaust gas temperature at an entrance of the SCR device, and a barometric pressure,
an SCR differential pressure estimation unit that estimates a differential pressure between a pressure at the entrance of the SCR device and the barometric pressure, based on the exhaust gas flow estimated by the exhaust gas flow estimation unit, the exhaust gas specific volume estimated by the exhaust gas specific volume estimation unit, and the SCR entrance temperature, and a $NO_x$ sensor pressure estimation unit that estimates a $NO_x$ sensor pressure by adding the barometric pressure to the differential pressure estimated by the SCR differential pressure estimation unit.

\* \* \* \* \*